June 27, 1967

C. A. FLOOD

Re. 26,226

STRIP FEED TENSION EQUALIZER

Original Filed Dec. 20, 1962

2 Sheets-Sheet 1

Inventor
Carl A. Flood
by Roberts, Cushman & Grover
Attys

STRIP FEED TENSION EQUALIZER

Original Filed Dec. 20, 1962 2 Sheets-Sheet 2

United States Patent Office

Re. 26,226
Reissued June 27, 1967

26,226
STRIP FEED TENSION EQUALIZER

Carl A. Flood, Framingham, Mass., by Dennison Manufacturing Company of Framingham, Mass., a corporation of Nevada, assignee Original No. 3,193,211, dated July 6, 1965, Ser. No. 246,067, Dec. 20, 1962. Application for reissue June 14, 1966, Ser. No. 563,936
5 Claims. (Cl. 242—75.43)

Matter enclosed in heavy brackets [ ] appears in the original patent but forms no part of this reissue specification; matter printed in italics indicates the additions made by reissue.

This invention relates to apparatus having a feed reel and a take-up reel with an intermediate driver to drive the strip at a constant speed along a predetermined path with a feed portion of the strip extending from the feed reel to the driver and a take-up portion extending from the driver to the take-up reel, and particularly to apparatus in which the feeder comprises a sprocket wheel meshing with a sprocket hole in the strip.

Objects of the invention are to equalize the tension on each side of the feeder, to avoid slippage in the case of friction feeders, to avoid damage to the sprocket holes in the case of sprocket feeders, and generally to improve the art of strip feeding.

According to the present invention the apparatus comprises a floating strip guide bearing on each of the aforesaid portions of the strip and having movement transversely of the aforesaid path in combination with a yielding interconnection between the strip guides for maintaining the tension substantially equal in the two portions. While the yielding interconnection may comprise a spring, preferably it comprises a piston and cylinder. The apparatus should also comprise means controlled by the aforesaid strip guides to keep the guides floating. The latter means preferably comprises a feed regulator for varying the feed from the feed reel to the aforesaid feed portion and a take-up regulator for varying the feed from the take-up portion to the take-up reel, the regulators being controlled by the aforesaid movements of the strip guides respectively. Preferably the feed regulator comprises a friction brake on the feed reel and the take-up regulator comprises a friction clutch for driving the take-up reel, but the regulators may comprise any suitable means such as variable speed motors for driving the reels respectively, the speed of the motors being governed by said movements respectively. Preferably each of the controllers includes a lever arm, and the interconnection is pneumatic and is between the lever arms.

For the purpose of illustration a typical embodiment of the invention is shown in the accompanying drawings in which FIG. 1 is a plan view of the apparatus;

Figure 1:
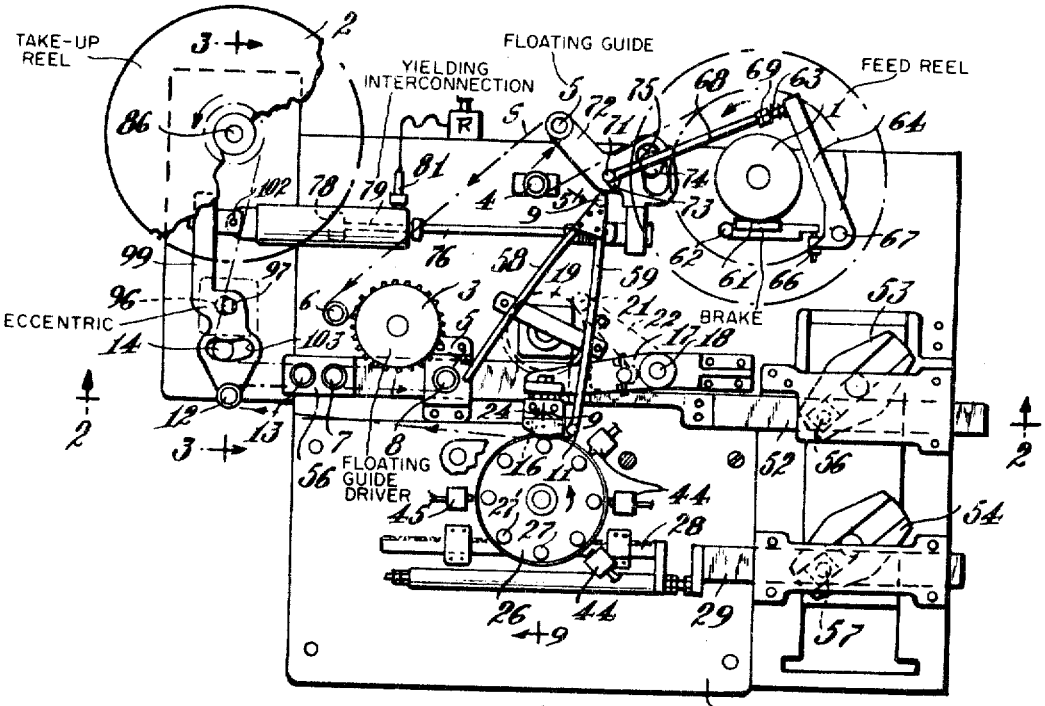
FIG. 1a is a plan view of a label strip.
Figure 1A:
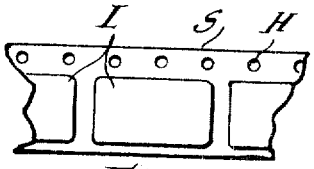

The invention is especially adapted to transfer labels from a strip to bottles. While any heat-transfer label strip S may be employed, the strip is preferably made as disclosed in Patent 2,862,832 of Ridgley G. Shepherd, Jr., dated December 2, 1958, and as illustrated in FIG. 1a where the label strip S comprises a paper backing having a marginal row of sprocket holes H, the backing being coated with oxidized wax adhesively to hold the labels L printed on the wax coating with ink which is heat-activatable so that when a label is pressed against a bottle or other article by means of a hot iron engaging the back of the strip S the label is transferred from the strip to the article.

Figure 2:
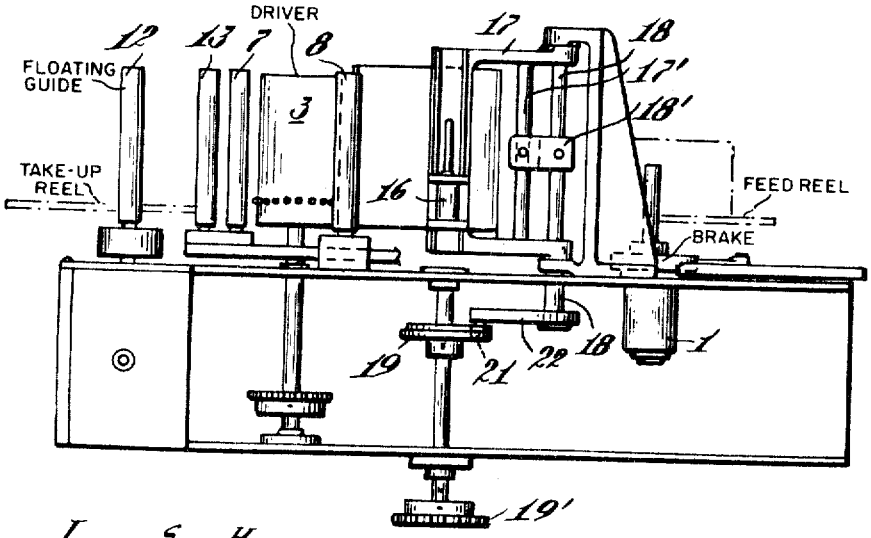
FIG. 2 is a section on line 2—2 of FIG. 1.

The particular embodiment of the invention chosen for the purpose of illustration comprises a feed reel 1, a take-up reel 2 and a sprocket wheel 3 for feeding the label strip S from the feed reel to the take-up reel over rollers 4, 5, 6, 7, 8, 9, 11, 12, 13 and 14, the strip S having sprocket holes H and carrying labels L. Between the rolls 11 and 12 is an applicator roll 16 which is mounted on a bracket 17 pivoted on shaft 18. The roll 16 is preferably covered with a resilient layer to accommodate irregularities in the surface of the article to be labeled. For example the roll may be covered with a layer of soft silicone rubber 3/16" thick. The applicator roll is moved back and forth between operative and inoperative positions by means of a cam 19 driven by sprocket 19' (FIG. 2) and a cam follower 21 on the arm 22 fast to the shaft 18, the cam follower 21 being held against the cam 19 by means of the usual spring (not shown). Bridging the two arms of the U-shaped bracket 17 is a rod 17' (FIG. 2) and fast to the shaft 18 is a U-shaped actuator 18' which straddles the rod 17' (FIG. 1). The applicator roll 16 is surrounded throughout most of its periphery by a heater 24 containing a heating coil which heats the periphery of the applicator roll by radiation. In traveling from roll 11 to the applicator roll 16 the strip bears against a surface on the heater 24 thereby to apply more heat to each label just before it is applied. To heat the strip to a predetermined temperature, the longer the surface 15 lengthwise of said path the lower the temperature of the surface. Preferably the temperature of heater 24 is higher than that of plates 58 and 59, for example 450° F. When the roll 16 and heater 24 are retracted to inoperative position they disengage the strip S. Inasmuch as the surface 15 and roll 16 engage the strip S only momentarily while a label is being applied, they may be heated to a temperature high enough to damage the label strip if they contacted the strip while the strip is decelerated between applications of successive labels as hereinafter described. The applicator roll 16 is rotated by frictional engagement with the strip S.

Opposite the applicator roll 16 is a turret 26 carrying a row of vials V on upstanding pins around the periphery of the turret. The turret 26 is rotated step by step in the direction of the arrow in FIG. 1 by means of a rack 28 actuated by reciprocating slide 29 as disclosed in my copending application Ser. No. 141,476, filed September [29] *28*, 1961, *now Patent No. 3,208,897*, and Ser. No. 246,066, filed on even date herewith, *now Patent No. 3,231,448*.

At each of the three stations between the loading station 27 and the applicator roll 16 (FIG. 1) is a gas-flame device 44 for heating the vials as they approach the applicator station in well-known manner. Another such device 45 may be located between the applicator station and the unloading station 7' to set the adhesive holding the labels on the vials. By preheating the vials the labels adhere quicker and better. As disclosed in the aforesaid application, the vial at the applicator station is rotated at the speed of the applicator roll so that there is no slippage between vial and label strip as a label is being applied.

The strip-guide rollers 7 and 13 are mounted on a carriage 51 which is reciprocated back and forth by slide 52 (FIG. 1). While a label is being applied by applicator 16 the carriage reciprocates to the right to permit the strip S to be pulled past the label-applying station at the same speed as the peripheral velocity of the rotating vial so that a label is transferred to the vial by the applicator roll 16. After the label is applied and while the next vial is being brought up to the applicator station, the carriage reciprocates to the left so that the strip is not advanced past the applicator station much if any. In this way the labels L on the strip S may be placed close together as shown in FIG. 1a, the portion of the strip between rolls 7 and 13 pausing between applications of successive labels to successive vials. The reciprocation of the slides 29 and 52 is controlled by cams 53 and 54 actuating cam rollers 56 and 57 on the two slides, respectively as fully described in my Patent 2,981,432, granted Apr. 25, 1961.

Between rollers 8 and 9 is an electrically heated plate 58 and between rollers 9 and 11 is another such plate 59, these plates serving to warm the labels L on strip S before they reach the label-applying roller 16, thereby to facilitate the transfer of the labels to the vials. By making these plates slightly concave lengthwise of the strip path the strip is caused to maintain close contact with the plates as it passes thereover and by providing a roller at each end of each plate the drag on the strip is minimized. By making the plates elongate heat may be applied to the label strip throughout a considerable portion of the length of its path without contacting the exposed surfaces of the labels while heated. The labels may be heated to 160°–180° F. for an indefinite time without damage. Preheating the label strip not only facilitates adhesion to the vials but also prevents wrinkling of the strip between labels by the heated applicator roll.

Figure 3:
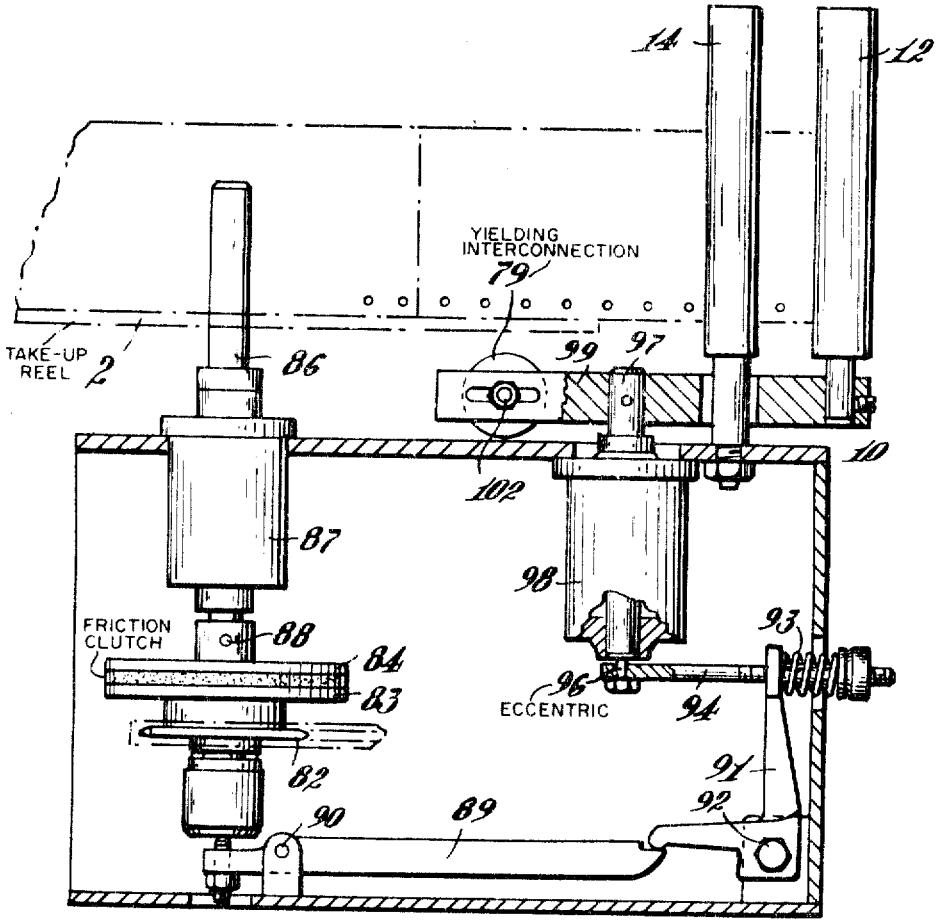
FIG. 3 is a section on line 3—3 of FIG. 1.
Figure 4:
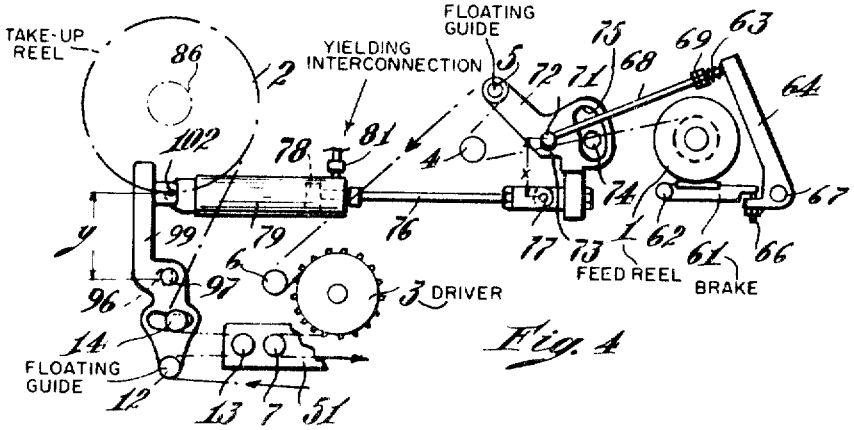
FIG. 4 is a diagrammatic plan view of parts of the apparatus.

As shown in FIGS. 1 to 4 the means for equalizing the tension in the strip S on opposite sides of the sprocket wheel 3, thereby to avoid tearing the sprocket holes, comprises the following mechanism. Bearing on the feed reel 1 is a brake 61 pivotally mounted on a shaft 62. The brake is pressed against the reel by a spring 63 acting on the brake through an arm 64 and an adjustable screw 66, the arm being pivotally mounted at 67. The spring is mounted on a link 68 which extends loosely into the upper end of arm 64 and bears against an adjusting nut 69. The other end of the link is pivotally connected to a pin 71 fast to a rocker arm 72 which is fast to a shaft 73. As shown in FIGS. 1 and 4 the axes of the pin 71 and shaft 73 are offset so that brake pressure is increased when the arm 72 rocks clockwise and is decreased when it rocks counterclockwise. A pin 71 extending through a slot 75 in the rocker arm limits the movement of the arm. The aforesaid roller 5 is mounted on one end of the rocker arm and the other end of the arm is pivotally connected to a piston rod 76 by a pin 77. The rod 76 is connected to a piston 78 in a cylinder 79 which is supplied with fluid under pressure through a conduit 81 and regulator R.

As shown in FIG. 3 the take-up reel 2 is driven by a sprocket wheel 82 through a friction clutch comprising a driving part 83 and a driven part 84 mounted on the take-up shaft 86 which is journaled in a bearing 87. The driven part 84 of the clutch is pinned to the shaft at 88 and the driving part 83 is freely rotatable on the shaft. Part 83 is pressed against part 84 by an arm 89 pivotally mounted at 90. Arm 89 is actuated by one end of a bell-crank 91 pivotally mounted at 92. The other end of the bell-crank is actuated by a spring 93 on a rod 94 which is reciprocated lengthwise by a pin 96 eccentrically fast to shaft 97 which is journaled in bearings 98 (FIGS. 1, 3 and 4). An arm 99 is mounted on the end of shaft 97 and is pinned thereto as shown in FIG. 3. The strip guide 12 is mounted on one end of the arm 99 and the other end of the arm is connected with the cylinder 79 at 102. The end of roller 14 extends through a slot 103 in arm 99 to limit the movement of the arm.

As the tension in the feed portion of the strip S between feed reel 1 and sprocket wheel 3 starts to increase for any reason, the arm 72 is rotated counterclockwise (FIGS. 1 and 2) thereby moving piston 78 to the right. This further compresses the air in cylinder 79, thereby increasing the tension in the take-up portion of the strip to balance the increase in the feed portion so as to avoid tearing the sprocket holes in the strip. Conversely if the tension in the take-up portion of the strip tends to increase, the tension in the feed portion is increased through the yielding interconnection of the piston and cylinder. Likewise if the tension in either portion starts to decrease, the tension in the other portion is automatically decreased.

In addition to this counterbalancing of tension, the arms 72 and 99 are kept floating by brake 61 and friction clutch 83–84 so that the roller 14 and pin 74 do not engage either end of their slots respectively (FIGS. 1 and 4). For example, when the arm 72 moves counterclockwise in response to momentary increase of tension in the feed portion, the lower end of slot 75 moves toward the pin 74, but this counterclockwise movement of the arm relieves the brake 61 to prevent the end of the slot from engaging the pin, thereby keeping the arm floating. Likewise when the arm moves clockwise in response to momentary decrease of tension the barking effect is increased to keep the upper end of the slot from engaging the pin. In the same manner movement of arm 99 varies the friction in clutch 83–84 to prevent the ends of slot 103 from engaging the roller 14, thereby keeping the arm floating.

The tension of the label strip between the sprocket wheel 3 and the feed reel 1 is determined by the amount of air pressure in the cylinder 79 providing the arm 72 is not against the pin 74. Initially the arm 72 is adjusted to midposition by adjusting the spring 63 so that when the arm 72 is moved clockwise to the stop position the braking action is heavier than will ever be required and when the arm is moved counterclockwise to the other stop position the braking action is lighter than will ever be required. Likewise the arm 99 is adjusted to midposition by adjusting spring 93. When the feed reel 1 is full the arm 72 swings to the exact position that will cause the brake to counterbalance the strip tension as determined by the air cylinder. As the feed reel is reduced in size the roll 5 moves counterclockwise to reduce the braking action accordingly. The same is true of the take-up reel. By adjusting the distances x and y (FIG. 4) relatively to each other for initial balance in tension on opposite sides of sprocket 3, the balance is automatically maintained notwithstanding variations in friction or other factors tending to unbalance the tension.

From the foregoing it will be understood that the rollers 5 and 12 constitute the floating guides referred to above and in the claims, that the piston 78 and cylinder 79 constitute the yielding interconnection referred to above and in the claims and that the sprocket wheel 3 constitutes the driver referred to in the claims.

It should be understood that the present disclosure is for the purpose of illustration only and that this invention includes all modifications and equivalents which fall within the scope of the appended claims.

I claim:

[1. In a strip machine having a feed reel and a take-up reel with an intermediate driver to drive the strip at a constant speed along a predetermined path with a feed portion of the strip extending from the feed reel to the driver and a take-up portion extending from the driver to the take-up reel, the combination of a floating strip guide bearing on each of said portions and having movement transversely of said path, and a yielding interconnection between said strip guides for maintaining the tension substantially equal in said portions.]

2. In a strip machine having a feed reel and a take-up reel with an intermediate driver to drive the strip at a constant speed along a predetermined path with a feed portion of the strip extending from the feed reel to the driver and a take-up portion extending from the driver to the take-up reel, a floating strip guide bearing on each of said portions and having movement transversely of said path, a yielding interconnection between said strip guides for maintaining the tension substantially equal in said portions, and means controlled by the movement of said strip guides to keep said strip guides floating.

3. In a strip machine having a feed reel and a take-up reel with an intermediate driver to drive the strip at a constant speed along a predetermined path with a feed portion of the strip extending from the feed reel to the driver and a take-up portion extending from the driver to the take-up reel, a floating feed guide bearing on said feed portion, a floating take-up guide bearing on said take-up portion, said guides having movement transversely of said path in response to tension in said portions respectively, a yielding interconnection between said strip guides for maintaining the tensions substantially equal in said portions, and means controlled by the movement of said guides to keep the guides floating, said last means including a feed regulator for varying the feed from the feed reel to the feed portion and a take-up regulator for varying the feed from the take-up portion to the take-up reel, and means responsive to said movements for controlling the regulators respectively.

4. The combination of claim 3 wherein the feed regulator comprises a brake for producing braking effect on the feed reel and the take-up regulator comprises a friction clutch for driving the take-up reel.

5. The combination of claim 3 wherein each of said controllers includes a lever arm and said interconnection is between the lever arms.

6. The combination of claim 3 wherein said yielding interconnection is pneumatic.

References Cited

The following references, cited by the Examiner, are of record in the patented file of this patent or the original patent.

UNITED STATES PATENTS

| | | | |
|---|---|---|---|
| 1,654,800 | 1/1928 | Garbutt | 242—55.14 |
| 1,733,830 | 10/1929 | Smith | 242—55.14 |
| 1,759,712 | 5/1930 | Richardson | 156—495 |
| 1,944,022 | 1/1934 | Bundick et al. | 242—55.14 |
| 2,462,558 | 2/1949 | Scheuermann et al. | 242—75.13 |
| 2,925,963 | 2/1960 | De Gelleke | 242—75.43 |
| 2,964,255 | 12/1960 | Harvey | 242—55.11 |
| 3,079,979 | 3/1963 | Flood | 156—542 |
| 3,083,887 | 4/1963 | Huck | 242—75.3 |
| 3,189,291 | 6/1965 | Welsh | 242—55.125 |

STANLEY N. GILREATH, *Primary Examiner.*

N. L. MINTZ, *Examiner.*